United States Patent [19]
Krent et al.

[11] Patent Number: 5,709,453
[45] Date of Patent: Jan. 20, 1998

[54] VEHICLE LIGHTING HAVING REMOTE LIGHT SOURCE

[76] Inventors: Edward D. Krent, 207 Hampton Rd., Sharon, Mass. 02067; Nicholas B. Paffett, 806 Tucker La., Hingham, Mass. 02043

[21] Appl. No.: 291,106

[22] Filed: Aug. 16, 1994

[51] Int. Cl.$^6$ ................................................ B60Q 1/00
[52] U.S. Cl. ........................ 362/80; 362/31; 362/61; 362/84; 362/100; 362/806
[58] Field of Search ............................ 362/26, 27, 31, 362/32, 61, 80, 84, 806, 80.1, 100; 250/484.2; 40/546

[56] References Cited

U.S. PATENT DOCUMENTS

| | | | |
|---|---|---|---|
| 2,359,559 | 10/1944 | Horky | 40/427 |
| 3,462,592 | 8/1969 | Schweich | 362/127 X |
| 3,802,708 | 4/1974 | Libert | 273/136 A |
| 4,118,654 | 10/1978 | Reich et al. | 362/32 |
| 4,745,525 | 5/1988 | Sheehy | 362/32 |
| 4,843,524 | 6/1989 | Krent et al. | 362/127 |
| 4,989,956 | 2/1991 | Wu et al. | 40/546 X |
| 5,227,773 | 7/1993 | Wu et al. | 362/31 X |

FOREIGN PATENT DOCUMENTS

| | | |
|---|---|---|
| 264120 | 4/1988 | European Pat. Off. . |
| 964026 | 6/1950 | France . |
| 994432 | 11/1951 | France . |

OTHER PUBLICATIONS

Mobay Corporation Information Sheet on LISA Plastics, Jan. 10, 1983, cv. sheet + pp. 1–4.

Anne Watzman, Article "Light–Emitting Plastics Challenge Neon", Chemical Week, Nov. 27, 1985, 2 pgs.

*Primary Examiner*—Stephen F. Husar
*Attorney, Agent, or Firm*—Wolf, Greenfield & Sacks, P.C.

[57] ABSTRACT

Apparatus for providing illumination on a vehicle utilizing light conducting, fluorescent substance containing sheets of material. In each embodiment, an exposed edge of the sheet of material is used to provide the intense, illuminated strip of light desired. Either natural light or a dedicated source of electric light is used to illuminate a light gathering portion of a sheet of this material which conducts the light to the edge to produce a brilliant strip of light. The strips can be disposed adjacent an automobile light, along seams in the body or along a spoiler disposed on the automobile. These sheets of material can also be positioned such that the edges thereof illuminate the location of lock cylinder, or the location of a door handle, or a vehicle logo. Retrofittable strips are also described.

5 Claims, 6 Drawing Sheets

VEHICLE LIGHTING HAVING REMOTE LIGHT SOURCE

FIELD OF THE INVENTION

This invention relates generally to decorative and functional lights for vehicles, and more particularly to lights for an automobile utilizing light conducting materials for conducting light to a location from a remote source.

BACKGROUND OF THE INVENTION

It has long been recognized that certain types of transparent plastic materials, particularly acrylics and polycarbonates, are light conducting along their length. It has also been recognized that when such light conducting plastics are extruded or otherwise formed into a sheet configuration having polished surfaces, and are illuminated by a light source, light will travel within the sheet between its two faces and will be visible primarily only along the edges thereof. These light conducting characteristics of certain plastics have been utilized previously in commercial displays and in other decorative and illuminating devices, such as those shown in U.S. Pat. Nos. 2,359,559, 3,462,592 and 4,843,524.

Fluorescent-dyed plastics are also known which absorb visible light and reradiate this light at certain visible wavelengths. When used in sheet form, the fluorescent light is collected and transmitted to the edges of the sheets of plastic where it produces a bright area of illumination. Such plastics have been used for commercial displays, sculpture, jewelry and the like.

Racing stripes and other distinctive decorations are popular on many automobiles, particularly on sport models. These designs generally are painted onto the automobile body, and are not illuminated.

Typically, any lighting for door handles, lock cylinders, keypads or the like requires the positioning of a light source closely adjacent to the area to be lighted. As a result, if the area to be lighted is exposed, the light source is vulnerable to weather or to vandals. Also, the light source can produce bulk which is undesirable from a functional or aesthetic point of view.

SUMMARY OF THE INVENTION

It has been discovered that the above-identified properties of light conducting plastic materials and fluorescent-dyed plastics can be used to great advantage in vehicles, such as automobiles, trucks, vans, utility vehicles, boats, trailers, airplanes, motorcycles, motor homes and the like for stylish or decorative detailing, and for providing functional illumination. In each of the embodiments of this invention, an element of a light conducting material, such as a fluorescent-dyed plastic, is illuminated along a face of a light gathering portion and the light is conducted to a light emitting edge. The light emitting edge of the element is formed into a desired shape. The light source and the light gathering surface typically are sealed within the vehicle body to prevent weather damage or to make it difficult for unauthorized persons to disable the light source. Such light conducting plastics may be deformed without loss of their light conducting properties. Thus, the light gathering portion of the element may be configured into any desired shape to allow it to be deployed at any location in the automobile in accordance with the space and size limitations imposed on it by the design characteristics of the vehicle or vehicle part.

In one embodiment, a dedicated light source is provided which emanates radiation at a location remote from the emitting edge and at a location which illuminates the light gathering portion of the element only. Any type of light source can be employed such as an incandescent light, or a fluorescent light or an ultraviolet light. In another embodiment, the light gathering portion of the element is positioned such that it receives ambient light from an external non-dedicated source, such as the sun. Light from the light source, or the ambient light is absorbed and reradiated and conducted to the edge of the element from which it is emitted. The light conducting material usually is provided with a desired color. If a dedicated light source is provided, it is shielded from the edge to prevent interference therewith.

In one embodiment, the edge forms an accent light along a tail light or head light. In another embodiment, the edge is disposed on a surface of a spoiler on the rear of a vehicle. In another further embodiment, the edge is disposed along a seam in a vehicle body, such as along the junction between a door or a trunk lid and an adjacent panel.

In further embodiments, such an element can provide useful illumination. In particular, the element can be deformed so that the edge thereof has a semi-circular configuration and surrounds the lock cylinder of a vehicle ignition, or a vehicle door, to facilitate deployment of a key in the dark. In another embodiment, the edge of the element can be disposed in the recess of an exterior door handle to either outline the handle or provide an indication of its location to facilitate opening of the door of the vehicle.

In a preferred embodiment, the light conducting material used for this invention is a fluorescent-dyed acrylic or polycarbonate. An example is that sold under the trademark LISA by Miles, Inc., Mobay Road, Pittsburgh, Pa. Another product is sold under the trademark ACRYLITE by Cyro Industries, Mount Arlington, N.J.

DESCRIPTION OF THE DRAWINGS

The objects, advantages and features of this invention will be more clearly appreciated from the following detailed description when taken in conjunction with the accompanying drawings in which.

DETAILED DESCRIPTION OF THE PREFERRED EMBODIMENTS

Figure 1:
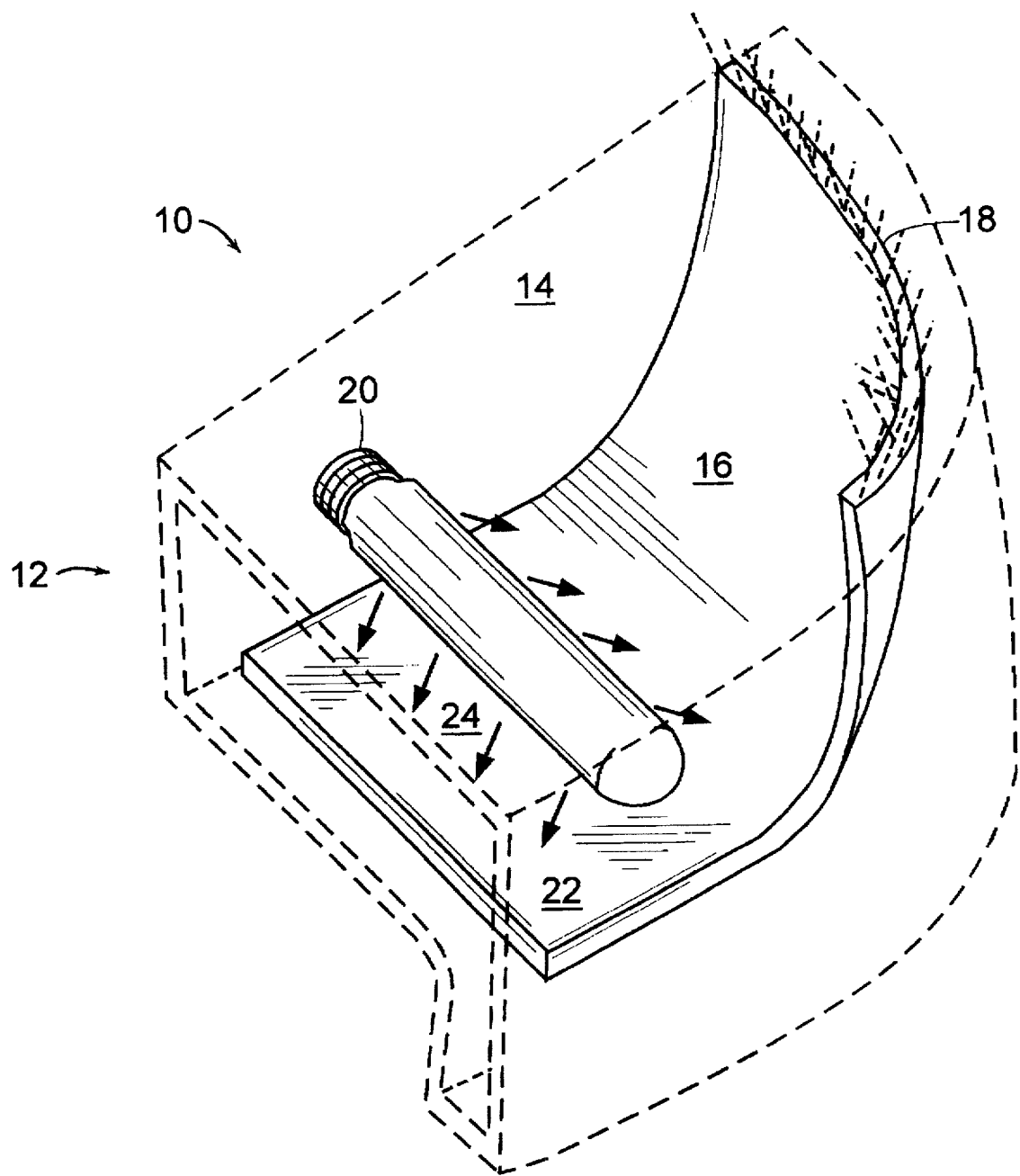
FIG. 1 is a conceptual, perspective view illustrating the illumination device of this invention.

With reference now to the drawings, and more particularly to FIG. 1 thereof, the illumination and decorative device 10 of this invention will be described. Device 10 typically is employed in conjunction with a vehicle, such as an automobile, and is used for providing illumination of a targeted area or for providing accent lighting or decorations on the exterior of the vehicle. For purposes of illustration only, this invention will be described with particular reference to an automobile. However, it is to be understood that the scope of this invention is not so limited and that the invention can be employed in conjunction with other types of vehicles such as trucks, vans, utility vehicles, motor homes, motorcycles, boats, trailers, airplanes, recreational vehicles, or the like.

FIG. 1 illustrates conceptually the elements of device 10 when used in conjunction with a vehicle. In a typical application, illumination or decoration is provided along a surface 14 of a body portion 12 of a vehicle. Examples of illumination or decoration that can be provided will be described hereinafter in more detail in conjunction with specific embodiments of this invention. Device 10 includes at least one sheet 16 extruded or otherwise formed of a light conducting material and at least one light source 20. Sheet 16 includes light gathering portion 22 having a light gathering surface 24 and an exposed edge 18 which is visible along surface 14 of portion 12. It is preferred that only edge 18 be visible along surface 14. Also, because of space limitations in vehicles, it is preferred that portion 22 of sheet 16 be enclosed within and protected by a housing or body portion 12. It would be undesirable for lower portion 22 to extend outside of body portion 12, or to require reconfiguration of body portion 12 to accept portion 22. Edge 18 typically is disposed flush with surface 14, although it need not be. Also, typically, sheet 16 is disposed generally normal to surface 14 adjacent edge 18 although it need not be.

Light source 20 is positioned such that radiation from light source 20 strikes surface 24. Preferably, all of surface 24 is directly and uniformly illuminated by radiation from light source 20, which strikes surface 24 at a perpendicular angle. The larger is the area illuminated and the more intense is light source 20, the brighter is edge 18. However, device 10 still functions adequately even if surface 24 is illuminated in a non-uniform manner or if the light strikes surface 24 indirectly or at a non-perpendicular angle. In one embodiment of the invention, light source 20 is a dedicated light source which is used only to illuminate portion 22. In this embodiment, light source 20 is disposed completely within body portion 12, is shielded from external light, and is not visible externally of body portion 12. As a result, light source 20 does not interfere with the decorative or illuminating effect of edge 18, and it is protected from vandalism and external elements. Light source 20 may be positioned to illuminate a lower edge of portion 22, but preferably, light source 20 illuminates a broad, exposed portion of surface 24 in a direction generally normal thereto. Light source 20 may be any conventional light source or a plurality of light sources, such as a fluorescent lamp or an incandescent lamp or an LED. Light source 20 may also be an ultraviolet source, in which case there would be less need to shield edge 18 visually from source 20. Each lamp may comprise a bulb, a tube, or an electroluminescent device. Preferably, although not necessarily, light source 20, is elongated, and extends generally parallel to surface 24. Light source 20 should be spaced sufficiently far from portion 22 so that it does not damage portion 22, but sufficiently close to portion 22 so that surface 24 is adequately illuminated. For most applications, light source 20 should be spaced in the range of from about one inch to about six inches from portion 22, although light source 20 may contact portion 22 if design considerations render such a configuration necessary.

In another embodiment, light source 20 may include ambient light such as sunlight, light from other sources external of body portion 12 and the like. In this embodiment, typically portion 22 is somewhat remote from edge 18, and a broad portion of surface 24 is exposed to ambient light.

As seen in FIG. 1, sheet 16 may be configured so that edge 18 has a different shape or configuration than portion 22. In fact, edge 18 and portion 22 may even be curved separately around orthogonal axes or to form compound curves. Because of space limitations, it may be necessary to deform portion 22 into a number of different shapes, so that it can be accommodated within body portion 12 without significant alteration of body portion 12. Portion 22 may have a generally planar configuration, or it may have a curved, cylindrical, spiral or even a semi-spherical configuration.

In a preferred embodiment, light source 20 is a fluorescent or other similar arc discharge type lamp, so that very little if any heat is generated. In addition, such lamps can be powered by a twelve volt DC power source, such as a vehicle battery.

Preferably, sheet 16 is formed of a light conducting, fluorescent substance containing material, such as a light transparent organic polymer or inorganic material. A preferred material is a fluorescent-dyed plastic. These light conducting, fluorescent-dyed plastics presently are available either in an acrylic or a polycarbonate composition and in a wide variety of colors. One acceptable, commercially available example of a fluorescent-dyed plastic is sold under the trademark LISA in the United States by Miles, Inc. of Mobay Road, Pittsburgh, Pa. 15205-9741. Another acceptable, commercially available example of a fluorescent-dyed plastic is an acrylic sold under the trademark ACRYLITE by Cyro Industries, Mount Arlington, N.J. 07856.

Such light conducting, fluorescent substance containing materials absorb direct or diffused light. Light striking surface 24 of portion 22 is refracted because of the higher refractive index of the material as compared with air. The light can either be in the visible range (400–700 nanometers) or ultraviolet range (about 40–400 nanometers). Part of the light is absorbed by the fluorescent dye stuff in the material. After a very short interval, the absorbed light energy is emitted as visible fluorescent light in a random direction within the material. Part of the re-emitted light which reaches the material-air interface at an angle smaller than an angle required for total reflection will be refracted and will exit sheet 16. The rest of the re-emitted light is totally reflected by the material-air interface, is collected and is transmitted to the edges. The extreme brightness of the edges is a result of lighting sheet 16 along an exposed, broad surface 24. Since portion 22 is larger in area than edge 18, which emits the light, the light emitted along edge 18 is concentrated and has an intensity greater than that of light source 20. If the concentration of dye stuff in the material is uniform throughout, the depth of color of sheet 16 is a function of the thickness thereof. The greater the thickness of sheet 16, the greater is its depth of color. Once light source 20 is removed or extinguished, this process of absorption and re-emission by sheet 16 ceases.

The intensity of the light emitted along edge 18 of sheet 16 is a function of the following: the intensity of the light striking sheet 16 from light source 20; the ratio of the area of surface 24, which collects light from light source 20, to the area of edge 18; the surface quality of sheet 16; and any impurities produced during processing of sheet 16. Obviously, the greater the intensity of the light emitted by light source 20, the greater is the intensity of light emitted by edge 18. Also, the larger the surface area of surface 24, the greater is the intensity of the light emitted by edge 18. Surface 24 should be kept as smooth as possible, so that a minimum amount of light is scattered and a maximum amount of light is absorbed or passes into sheet 16. Also, smoother surfaces will permit better reflection of light from the material-air interface within sheet 16 and better transmission thereof to edge 18. Finally, the fewer the impurities, the more intense is the light at edge 18.

Surface 24 may be provided either with simple curves or compound curves to accommodate the size and configuration of body portion 12. Even with these curves, lower portion 22 still functions to capture light and distribute it to an edge. By sealing lower portion 22 within body portion 12, source 20 is protected from water, temperature and other adverse weather conditions, and tampering therewith by a vandal is rendered difficult if not impossible. Therefore, the illumination provided by edge 18 cannot be easily disrupted.

To maximize the utilization of light from source 20, in one embodiment, portion 22 is wrapped almost entirely about source 20, so that virtually all of the light energy from source 20 strikes surface 24. In another embodiment, as shown in FIG. 1, a reflector is provided on a side of light source 20 opposite surface 24, so that any light not directly striking surface or reflected from surface 24 is captured by reflector 26 and is returned to surface 24.

Figures 2, 3, 4, 6:
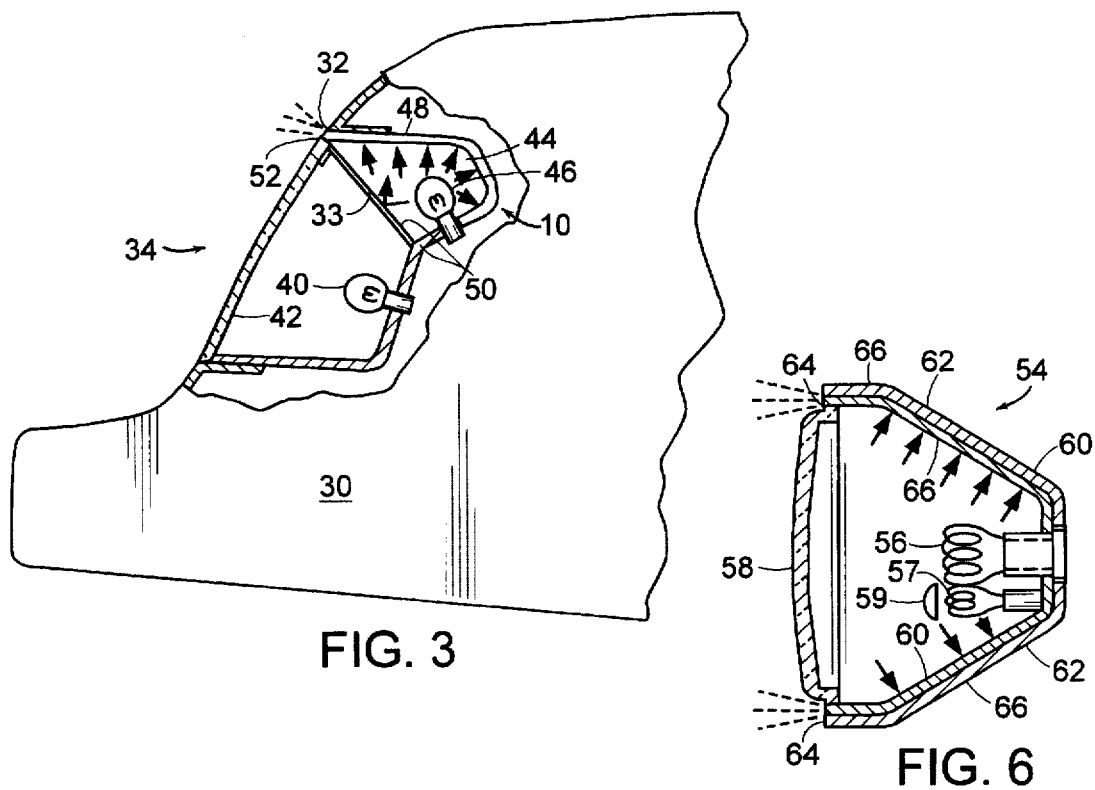
FIG. 2 is a partial, perspective view of the rear end of a vehicle showing use of this invention with a tail light and spoiler.
FIG. 3 is a cutaway, partial cross-sectional view of the tail light of FIG. 2.
FIG. 4 is a cutaway, cross-sectional view of the spoiler of FIG. 2 illustrating another embodiment of this invention.
FIG. 6 is a cross-sectional side view of the vehicle head light of FIG. 5 illustrating another embodiment of this invention when used with a headlight.

Exemplary embodiments of the device 10 of this invention will now be described with particular reference to FIGS. 2–4. Two embodiments of device 10 are shown in FIG. 2 which illustrates generally the rear end of a vehicle such as vehicle 30. In one embodiment, accent lines 32 are provided around light 34, which typically is a tail light. In another embodiment, an accent line 36 is provided on a spoiler or air foil 38.

With reference now to FIG. 3, one embodiment of accent line 32 on tail light 34 is illustrated. Tail light 34 is a conventional tail light used on a vehicle, such as vehicle 30, and includes a lamp 40 and lens 42. Disposed directly adjacent tail light 34 and separated therefrom by a partition 33 is a cavity 44 containing the device 10 of this invention. Cavity 44 is formed between the structural panels or within a portion of the body of vehicle 30. Cavity 44 may have any shape or configuration required by the structural and aesthetic demands placed upon it by vehicle 30. This embodiment typically includes a light source 46 within cavity 44, a sheet 48 of a light conducting, fluorescent substance containing material, which extends around at least a portion of the interior of cavity 44 and a light reflecting surface 50. Surface 50 is disposed along interior surfaces of partition 33 and along interior surfaces of cavity 44 that are not bounded by sheet 48. As shown in FIG. 3, in an exemplary embodiment, sheet 48 is deformed into somewhat of a U-shaped configuration and is disposed on one side of source 46. An edge 52 of sheet 48 is exposed adjacent lens 42 of tail light 34 to provide the desired accent line 32. Reflecting surface 50 captures light and reflects it toward sheet 48 to maximize the amount of light collected by sheet 48. Partition 33 and surface 50 shield cavity 44 from lamp 40 and shield tail light 34 from cavity 44. This separation maximizes the light received by sheet 48 and prevents any light from source 46 from exiting through lens 42. In this manner, the accent lighting provided at edge 52 is sharpened and enhanced. In the embodiment of FIG. 3, typically lens 42 is provided with one color, while edge 52 emanates a different color. The colors chosen would depend upon the particular effect desired.

FIG. 4 illustrates another aspect of this invention in which an accent or decorative strip is provided on spoiler or air foil 36. In the embodiment illustrated in FIG. 4, only ambient light or sunlight is used. A flat sheet 70 of a light conducting, fluorescent substance containing material is disposed within a cavity 72 formed within spoiler 36. Sheet 70 preferably extends along spoiler 36 from one side to the other and is illuminated along its entire length for a uniform intensity. Cavity 72 is defined by opaque structural members 78. Edge 74 of sheet 70 is disposed along an outer edge 76 of spoiler 36 to provide the desired accent. A window 80 is provided in an upper surface of member 78 of spoiler 36. Preferably, window 80 is positioned to capture the maximum amount of sunlight. Window 80 may be either transparent or translucent, so long as sunlight is allowed to pass therethrough. Window 80 could also comprise a lens or a series of lenses for collecting and focusing ambient light on sheet 70. Preferably, opaque section 82 is disposed between window 80 and edge 74 on the upper surface of spoiler 36. Section 82 separates edge 74 from the source of light to provide a more distinctive and brilliant effect along edge 74. However, it is to be understood, that opaque section 82 can be omitted, and window 80 could extend up to edge 74, if desired. It should also be understood that while this embodiment has been described with respect to the use of ambient light, cavity 72 could be completely enclosed, and an electric light lamp or a plurality of electric light sources (not shown) could be inserted within cavity 72 to provide the source of light for edge 74. The use of a dedicated light source is particularly desirable if the light source is electrically coupled to the brakes and serves as a brake light.

Figure 5:
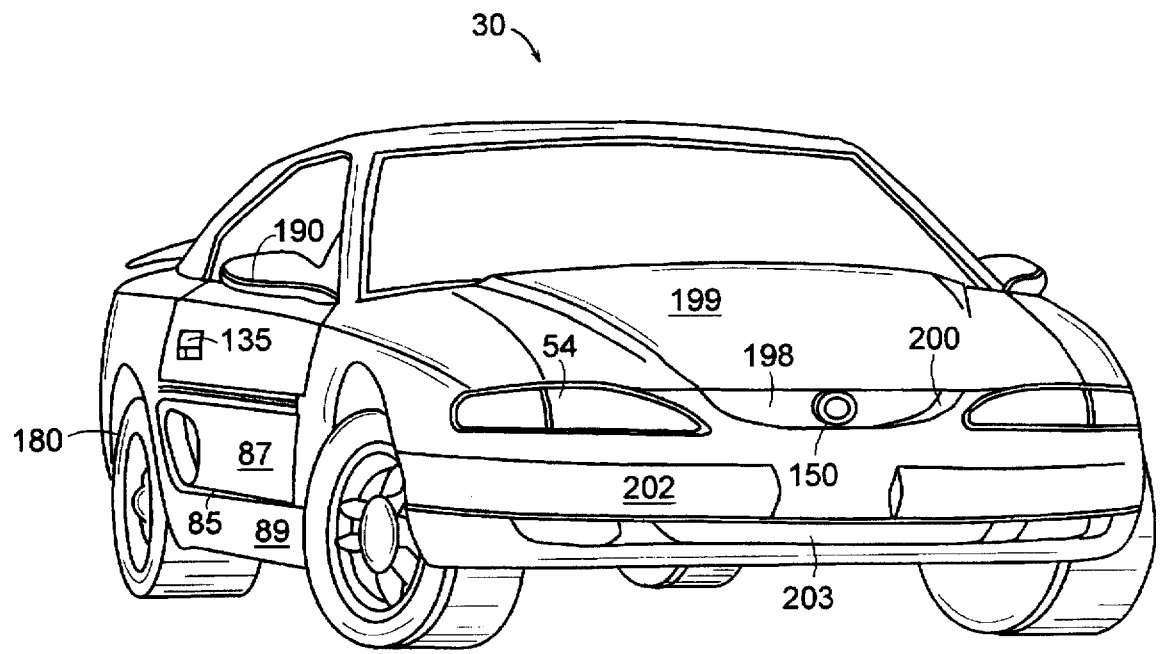
FIG. 5 is a front, perspective view of the vehicle of FIG. 1 illustrating other embodiments of this invention.

FIG. 5 is a front, perspective view of the vehicle 30 of FIG. 2 illustrating other embodiments of this invention when used with a headlight 54, illumination along a seam 85, illumination of a door handle 135, illumination of an emblem 150, illuminated safety markers 190 on the rear view mirrors, trim around the grille 200, front edge illumination 202 along the bumper and retrofittable strip illumination 180. Embodiments of the illumination of headlights 54, door handle 135 and emblem 150 will be discussed with particular reference to FIGS. 6–10 and 12. There will be no specific discussion of safety markers 190 on the rearview mirrors or of the grille opening trim 200 or of the front edge illumination 202 along the bumper. Each of these latter three embodiments may have the same configuration and structure as found in the strip lighting along seam 85, if built into the vehicle at the time of manufacture, or they may have the structure of the retrofittable strip illumination 180, if the lighting is installed after manufacture of the vehicle.

FIG. 6 illustrates the embodiment of this invention in which illumination is provided around light 54, which could represent either a tail light or a headlight. However, typically, in this embodiment, light 54 is a headlight. Light 54 includes a lamp or light source 56, reflector 66 on housing 62 and a lens 58. Sheet or sheets 60 of a light conducting, fluorescent substance containing material are disposed along an interior surface of housing 62 on at least one side of light 54. Preferably, sheets 62 surround light 54 on all sides. Sheet or sheets 60 include edge 64 which is disposed closely adjacent lens 58 and provides the desired accent around light 54. Preferably, sheet or sheets 60 are positioned inside of a reflector 66 so that the light from source 56 passes through sheet or sheets 60 to reflector 66 and so that any and all light not absorbed by sheet or sheets 60 is directed by reflector 66 through lens 58. As can be seen, in contrast to the embodiment shown in FIG. 3, light source 56 provides both the light which passes through lens 58 as well as the light absorbed by sheet or sheets 60 and conducted to edge 64. This embodiment may also include an ultraviolet light source 57 which could be utilized when source 56 is not activated to provide the desired look even if no light emanates from lens 58. A shield or reflector 59 may be placed on the lens side of source 57 to maximize absorption of ultraviolet light by sheet or sheets 60. In this embodiment, typically lens 58 is transparent, while sheet or sheets 60 and thus edge 64 have a different color to provide the desired decorative accent. Preferably, source 56 is a higher intensity source, to provide the light necessary for proper illumination, as well as sufficient light for the desired intensity along edge 64.

In another aspect of this invention, as illustrated in FIGS. 2 and 5, a decorative, lighted strip may be provided along the seams between panels of the vehicle. Also, a seam could be the junction between a body door or lid or hood and an adjacent body member or panel. As shown in FIG. 2, for example, this seam could be the junction between the trunk lid 31 and the lower body 33 of the vehicle 30. (See, FIGS. 7 and 8). This seam could also be seam 85 between door 87 and rocker panel 89, or the seam between bumper 202 and panel 203 or the seam between hood 199 and grill 198, all as illustrated in FIG. 5. It is to be understood that this invention is not so limited and may be used along any seam between any two panels or along the edges of any panels on an automobile or other vehicle, including door panels, hood panels, side structural panels, mud flaps, lower skirts, rocker panels, roof panels, windows, a door panel and an adjacent structural member, the hood and an adjacent member, a rocker panel and adjacent door panel and a window and adjacent structural member.

Figure 7:
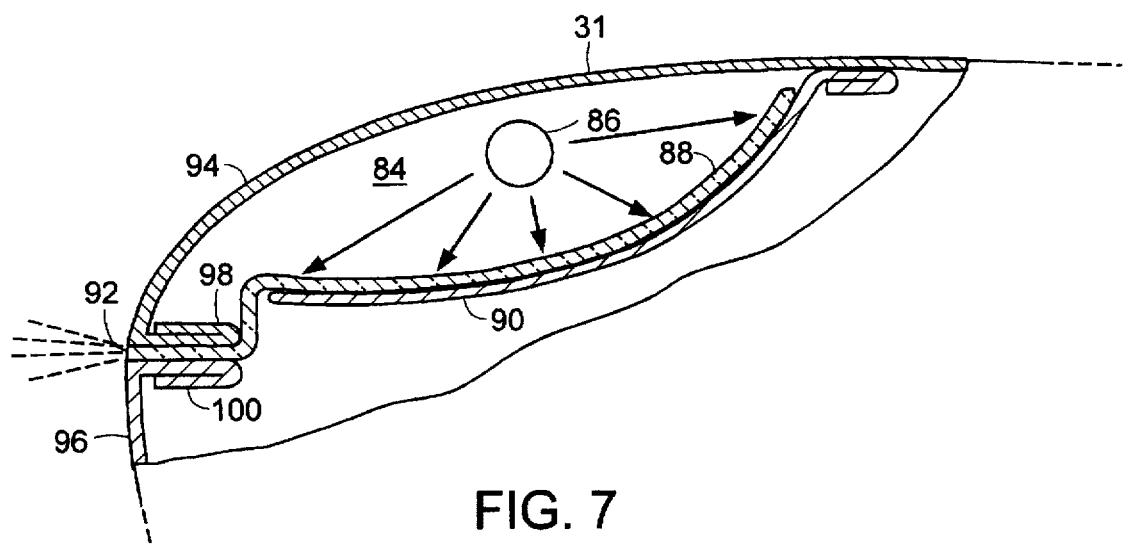
FIG. 7 is a partial, cross-sectional side view of a portion of an automobile illustrating use of this invention with a trunk or door.

With reference now to FIG. 7, in this embodiment of this aspect of the invention, the lighted edge 92 is positioned between two panels 94 and 96, which are associated with a structural element of vehicle 30, such as trunk lid 31. Typically, a cavity 84 is formed in lid 31 and is defined by member 90 which is a sheet of metal or the like and upper panel 94. Upper panel 94 typically forms the outer surface of trunk lid 31, and lower panel 96 forms the rear surface of vehicle 30 adjacent lights 34. However, as indicated, panels 94 and 96 may represent any other adjacent panels on vehicle 30. The shape and size of cavity 84 is not part of this invention and typically is dictated by the design and space requirements of the vehicle. Disposed within cavity 84 is a dedicated light source 86 and a sheet 88 of a light conducting, fluorescent substance containing material having edge 92. Sheet 88 has been configured to conform to the shape of the inside of cavity 84, and in the embodiment shown in FIG. 7, has a slightly curved shape so that it takes up as little space as possible within lid 31. Sheet 88 is supported by lower structural member 90. Member 90 preferably is formed of an opaque material to prevent light from escaping from cavity 84, although member 90 need not be opaque. Edge 92 of sheet 88 is disposed in the seam between upper panel 94 and lower panel 96 and extends between seals 98 and 100 which are associated with panels 94 and 96 respectively. Seals 98 and 100 typically are formed of rubber or some other like material and prevent the escape of light from cavity 84, and the entry of water, air or the like into cavity 84. Source 86 may be a single lamp, such as either a light lamp or a fluorescent lamp, or it may comprise a plurality of lamps. Preferably a single or plurality of fluorescent lamps are provided, the number of lamps being determined by the desired level of brightness, the surface area of sheet 88 and the lateral extent of edge 92.

Figure 8:
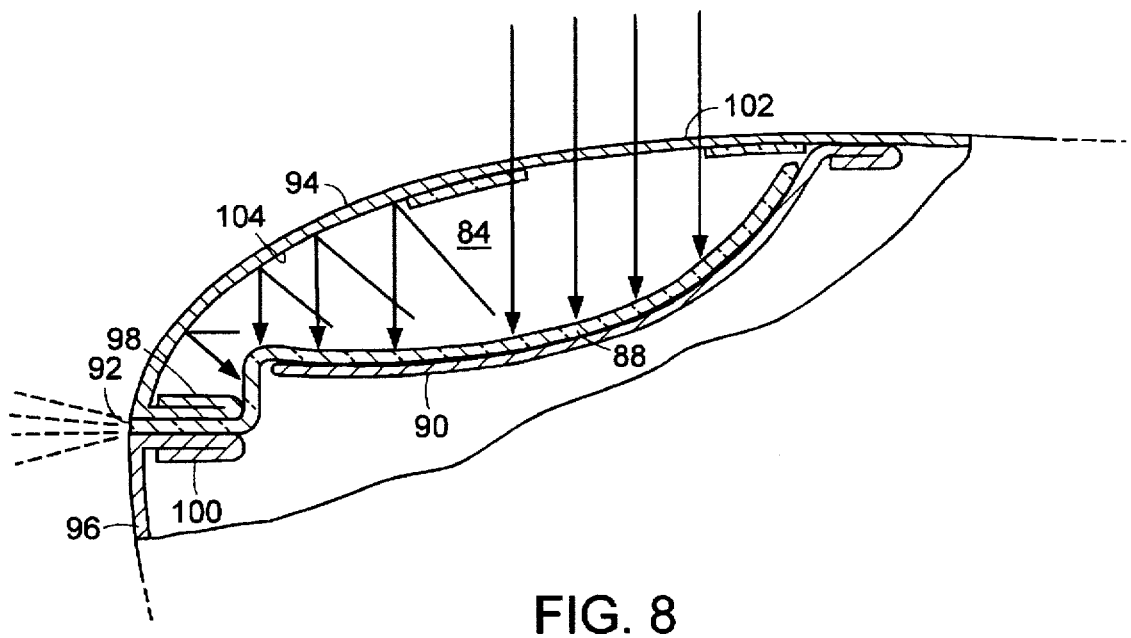
FIG. 8 is a partial, cross-sectional side view illustrating use of this invention with a trunk or door utilizing ambient light.

An alternative embodiment of this aspect of the invention is illustrated in FIG. 8. Like numbers are used for like parts where applicable. Instead of a dedicated light source as in FIG. 7, FIG. 8 utilizes ambient light or sunlight. Disposed in a gap in upper panel 94 is a window 102 formed of a transparent or translucent material. Window 102 permits entry into cavity 84 of sunlight or ambient light from around the vehicle. The size of window 102 depends upon the desired brightness of edge 92 and the size of sheet 88. Typically, window 102 extends over approximately one-half of sheet 88. As in FIG. 7, sheet 88 is supported by structural member 90, and edge 92 of sheet 88 extends between seals 98 and 100 and into the seam between panels 94 and 96. The interior surfaces of panel 94 at locations spaced from window 102 preferably are provided with a reflector 104 which directs any light reflected from sheet 88 or the sides of cavity 84 back onto sheet 88. Such a reflector 104 results in more efficient use of the light entering window 102. Window 102 also may comprise a lens or plurality of lenses for focusing the light onto sheet 88.

Figure 9:
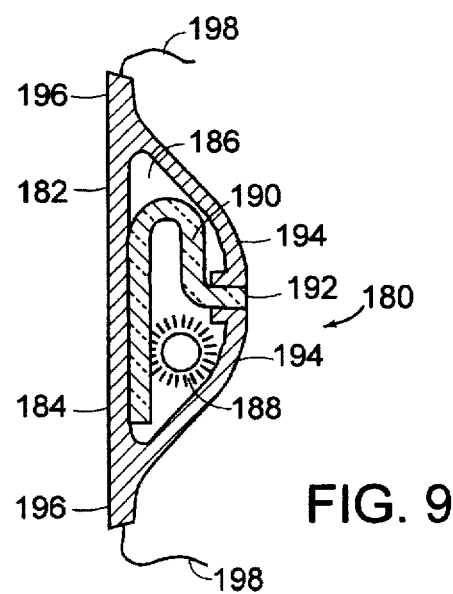
FIG. 9 is a cross-sectional side view illustrating use of this invention with the strip illumination of FIG. 5.

Yet another embodiment of this aspect of the invention will now be described with reference to FIGS. 5 and 9. FIGS. 7 and 8 described the use of decorative strips which were built into the vehicle at the time of manufacture. FIG. 9 illustrates such decorative strips 180 which can be applied to a vehicle along a seam or elsewhere after the vehicle has been manufactured. These retrofittable illumination strips 180 can be applied anywhere on a vehicle, as desired, so long as they can be coupled to the vehicle's electrical system for powering thereof. Typically, such strips 180 are applied along the same seams as the decorative, lighted strips illustrated in FIGS. 2–8.

Each strip 180 comprises a molded body 182 which has a flat back surface 184 to which an adhesive is applied, an interior cavity 186, a light source 188 and a sheet 190 of a light conducting, fluorescent substance containing material. Preferably, light source 188 and sheet 190 are disposed within cavity 186. As shown in FIG. 9, typically, sheet 190 is configured to conform to the interior shape of cavity 186 to maximize the surface of sheet 190 which is exposed to light from source 188. An edge 192 of sheet 190 extends through a slot formed between two spaced wall members 194 formed in body 182. Typically, wall members 194 are configured to be biased toward one another to tightly clamp edge 192 therebetween to seal the interior of cavity 186 from weather, vandals, or the like. Preferably, source 188 is a plurality of discreet light sources or lamps arrayed along the length of cavity 186 from one end of body 182 to the other. Preferably, body 182 is molded of a plastic or rubber material, such as urethane. While adhesive is the preferred means for attaching body 182 to a vehicle, body 182 may also be secured by screws, rivets, or other like fasteners adjacent edges 196 thereof. Light source 188 typically is powered by connecting it to the electrical system of the vehicle by means of wires 198. Source 188 may be continuously illuminated, or it may be illuminated at random intervals, or it may be coupled to the brake system of the automobile to be illuminated only when brakes are applied. Sheet 190 may be of any desired color, or multiple sheets 190 may be affixed adjacent one another to provide a two-tone or a three-tone strip of light.

Figure 10:
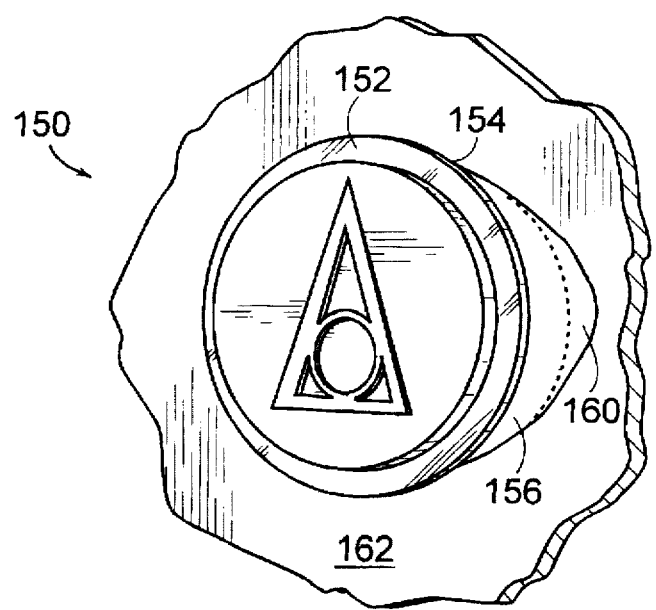
FIG. 10 is a cross-sectional side view illustrating use of this invention with a vehicle logo of FIG. 5.

Another embodiment of this aspect of the invention will now be described with particular reference to FIGS. 5 and 10 in which the use of this invention with an emblem or logo 150 on a vehicle is illustrated. Emblem 150 typically is opaque, and is typically made of molded plastic. Emblem 150 may have translucent or transparent areas. Emblem 150 typically is displayed on a vehicle grille, trunk lid, hood, body panel or an instrument panel on the interior of the vehicle. While emblem 150 is shown as being circular in configuration, some emblems have different shapes, and the particular shape of the emblem forms no part of this invention, since this invention may be used with any shape of emblem 150.

The goal of this embodiment of this aspect of the invention is to create a halo or ring of illumination about the emblem. Typically, the halo or ring has the same shape as the outer perimeter of the emblem. Disposed directly behind emblem 150 is a flat sheet 152 of a light conducting, fluorescent substance containing material. Sheet 152 typically has exactly the same shape as emblem 150 and is provided with an outer dimension which is just slightly larger than the outer dimension of emblem 150, so that the outer edge 154 of sheet 152 is visible around the entire perimeter of emblem 150. Outer edge 154 may be chamfered, as shown in FIG. 10, or it may be perpendicular to the flat front and back surfaces of sheet 152 (not shown). Disposed directly behind sheet 152 is a source of illumination 156. Source 156 may be an incandescent lamp, a fluorescent lamp, an ultraviolet source or some other gas filled luminous tube or lamp. Source 156 preferably is bonded to the back surface of sheet 152, although it need not be, so long as source 156 adequately illuminates the back, light gathering surface of sheet 152 to provide the desired intensity of illumination at edge 154. Light from source 156 is absorbed by sheet 152 and is conducted to edges 154 where it is emitted to form a bright ring or halo about logo 150. In the chamfered version shown in FIG. 10, the light is emitted in a direction somewhat toward the viewer in front of the logo, while in the version in which the edges 154 are perpendicular to front and back surface of sheet 152, the light is emitted in a direction generally parallel to the lateral extent of emblem 150, or in a direction generally perpendicular to the top surface thereof. Preferably, a reflector 160 is disposed behind source 156 to direct all light from source 156 toward surface 158. Emblem 150, sheet 152 and source 156 typically are all mounted in body panel 162 which could be a solid panel, a grille, or any other panel on a vehicle upon which it is desired to display emblem 150.

Figure 10A:
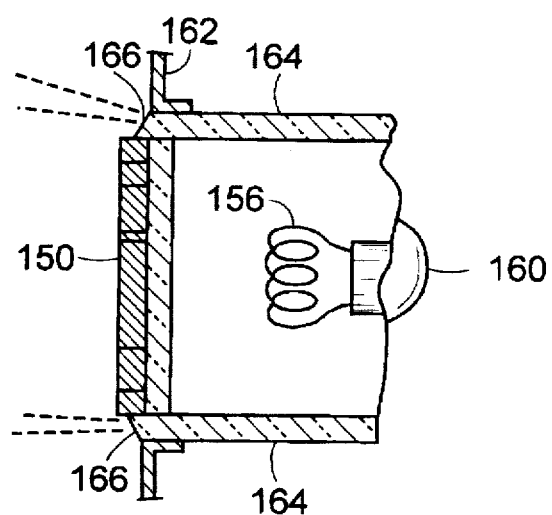
FIG. 10A is a cross-sectional side view of an alternative embodiment of the illuminated logo of FIG. 10.

Another version of this embodiment will now be described with reference to FIG. 10A in which like numbers are used for like parts, where applicable. In FIG. 10A, emblem 150 is again mounted in panel 162 or the like. In this embodiment, emblem 150 is surrounded by a ring 164 formed of a light conducting, fluorescent substance containing material. Ring 164 includes edges 166. Light from source 156 is absorbed by the inner surface of ring 164 and is emitted at edges 166 to provide an illuminated border around emblem 150. Source 156 also includes a reflector 160, as in FIG. 10.

Figure 11:
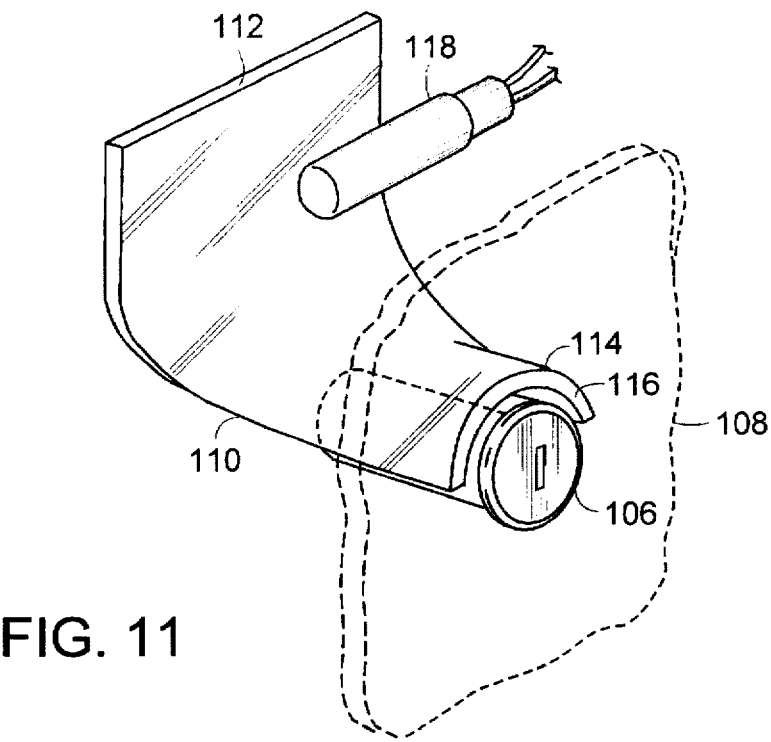
FIG. 11 is a perspective view illustrating use of this invention with a lock cylinder.
Figure 12:
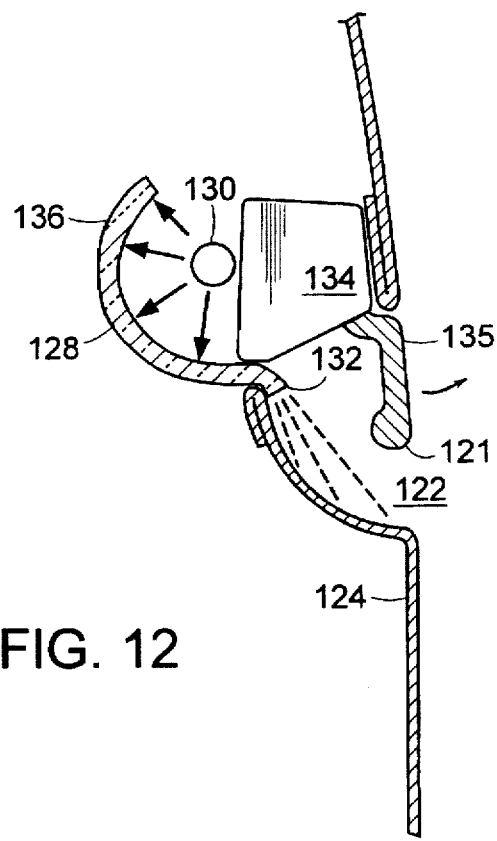
FIG. 12 is a partial, cross-sectional side view illustrating use of this invention with the vehicle door handle of FIG. 5.

While FIGS. 2–10A primarily represent decorative uses of this invention, FIGS. 11 and 12 illustrate practical or safety uses of the present invention. FIG. 11 illustrates the use of this invention to illuminate a lock cylinder of a vehicle to facilitate the location of the lock cylinder for insertion of a key. Lock cylinder 106 may be an ignition lock, a door lock, a trunk lock, a security lock or any other similar type of lock which may be difficult to locate in the dark. Cylinder 106 typically extends through and is flush with a structural member 108, such as a door, trunk lid, interior panel or the like. In most applications there is little room available for adding lighting. A sheet 110 of a light conducting, fluorescent substance containing material must be configured to adapt to the space limitations. In the embodiment shown in FIG. 11, sheet 110 is formed at one end about a first axis into a semi-circular portion 114 surrounding lock cylinder 106 and is curved at the other end about a second axis perpendicular to the first axis to form a light gathering portion 112. Portion 114 terminates in edge 116 which surrounds the lock cylinder 106 at the point where one inserts a key. A light source 118 is positioned adjacent portion 112 and preferably is elongated and is disposed along the second axis of curvature of portion 112 to be spaced somewhat equidistant from the surface thereof. However, different light sources may be used, such as a plurality of lamps or even a single, generally spherical lamp. Portion 112 is shielded from edge 116 by structural member 108. Portion 112 may be formed into different shapes which are defined by the space limitations of the vehicle design. Typically, the radius of curvature of portion 114 is less than the radius of curvature of portion 112, although it need not be. The particular configuration shown in FIG. 11 permits sheet 110 to be positioned in a very limited space and allows sheet 110 to accommodate the particular configuration of a vehicle instrument panel, or the like. In addition, should sheet 110 be used in conjunction with a door lock, the configuration shown in FIG. 11 allows sheet 110 to adapt to the relative lack of available space within the door structure without requiring modification of the overall design.

In FIG. 12, this invention is used to illuminate a door handle 135 or the like, as shown in FIG. 5, to permit location thereof in the dark. However, it is to be understood, that the embodiment of FIG. 12 could be used in conjunction with other latches or handles on a vehicle and is not limited to use with a door handle. On a vehicle door, typically, a door handle 135 has a lower end 121 disposed within a well 122 in a door panel 124. The other end of handle 135 is attached to a latching mechanism 134 within the door. In this embodiment, a sheet 128 of a light conducting, fluorescent substance containing material is provided such that an edge 132 thereof is positioned within well 122 just below latching mechanism 134. Light source 130 is disposed closely adjacent a light gathering portion 136 of sheet 128. Portion 136 typically is deformed into a curved shape to allow portion 136 to present as large a surface area as possible to source 130 while taking up as little room as possible within the door. Typically, light source 130 is at the center of portion 136, or is positioned along the axis about which portion 136 has been deformed so that source 130 is equidistant from most portions of portion 136, a distance which generally equals the radius of curvature thereof. By placing portion 136 and light source 130 within the door structure, light source 130 is sealed from the elements and is protected from intruders. Edge 132 provides an intense light which illuminates door handle 135 and an area surrounding handle 135 near lower end 121 thereof.

The light conducting, fluorescent substance containing materials utilized in this invention can be formed into simple curved configurations or into planar configurations, or into compound curves which substantially surround the light source and capture all of the emitted light. The edge which delivers the light in an intense fashion can be further configured to surround or outline the areas which require lighting or decoration. These light conducting, fluorescent substance containing materials can either be molded into the desired shape at the time of manufacture, or they can be formed on site into the desired shape from pre-existing sheets by heating the sheets and bending them around molds, mandrels or the like. In either case, the outer light gathering surfaces should be highly polished to capture as much light as possible. Typically, the edge portion is buffed smooth as well, although it could also be textured.

In view of the above description, it is likely that modifications and improvements may occur to those skilled in the art which are within the scope of this invention. The above description is intended to be exemplary only, the scope of the invention being defined by the following claims and their equivalents.

What is claimed is:

1. In a vehicle, an illumination device comprising:
   a sheet formed of a light conducting, fluorescent substance containing material, said sheet having a light emitting edge and a light gathering portion disposed in a cavity in the vehicle;
   a source of illumination for directing light onto said light gathering portion of said sheet; and
   at least one panel on said vehicle disposed adjacent to said light gathering portion of said sheet and said source of illumination to protect said light gathering portion of said sheet and said source of illumination from an external environment, said edge of said sheet being visible externally of said at least one panel on said vehicle.

2. The device as recited in claim 1, wherein said edge of said sheet is disposed along a seam between two panels on an exterior surface of the vehicle.

3. The device as recited in claim 1, wherein said source of illumination comprises at least one electrically powered lighting element disposed in close proximity to said light gathering portion of said sheet.

4. An apparatus for providing an illuminated strip in a seam between two panels on a surface of an automobile, said apparatus comprising:
   a sheet formed of a light conducting, fluorescent substance containing material having an edge disposed along the seam between the two panels and having a light gathering portion at a location remote from said edge;
   a source of illumination for directing light onto said light gathering portion of said sheet; and
   a housing for at least partially enclosing said source of illumination and said light gathering portion of said sheet for protection thereof against an external environment and for preventing light from said source of illumination from being visible except along said edge of said sheet.

5. The apparatus as recited in claim 4, wherein said source of illumination is at least a single electrically powered lamp disposed adjacent said light gathering portion of said sheet.

* * * * *